United States Patent

Archambault et al.

[11] Patent Number: 5,730,410
[45] Date of Patent: Mar. 24, 1998

[54] CEILING MOUNTED DISPLACEABLE SUPPORT ARM FOR SUSPENDING A DEVICE

[76] Inventors: Marc-Antoine Archambault, 8774 René Labelle St., Montreal, Quebec, Canada, H2M 2L7; Philippe April, 320 Goyer Blvd., St-Eustache, Quebec, Canada, J7P 5K1; Pascal Octeau, 178 Guérin St., St-Eustache, Quebec, Canada, J7P 1K5; Bernard Lefebvre, 8580 Place Alderic Beaulac, Montreal, Quebec, Canada, H2M 2S6

[21] Appl. No.: 661,045

[22] Filed: Jun. 10, 1996

[51] Int. Cl.⁶ ................................................. A47H 1/10
[52] U.S. Cl. ................. 248/323; 248/324; 248/289.11; 105/150; 188/67
[58] Field of Search ......................... 248/317, 323, 248/324, 298.1, 289.11, 292.12; 188/67; 104/89, 93, 95; 105/150, 155

[56] References Cited

U.S. PATENT DOCUMENTS

| | | |
|---|---|---|
| 3,167,285 | 1/1965 | Suozzo ........................ 248/324 X |
| 4,189,124 | 2/1980 | Faris . |
| 4,273,374 | 6/1981 | Portman . |
| 4,339,146 | 7/1982 | Lehmann . |
| 4,499,977 | 2/1985 | Wang ............................... 188/67 X |
| 4,534,269 | 8/1985 | Scerbo et al. .................. 188/67 X |
| 4,630,544 | 12/1986 | Hecht et al. ................... 105/150 X |
| 4,633,758 | 1/1987 | Kedzierski ..................... 188/67 X |
| 4,738,369 | 4/1988 | Desjardins . |
| 5,037,267 | 8/1991 | Warner et al. ................ 248/324 X |
| 5,165,647 | 11/1992 | Ribeiro ............................... 248/323 |
| 5,355,804 | 10/1994 | Garcia et al. ................. 105/150 X |
| 5,524,548 | 6/1996 | Fox ................................. 104/95 X |

Primary Examiner—Lanna Mai

[57] ABSTRACT

A support arm for attaching a device in a suspended manner is described. The support arm comprises a carriage secured to a top portion thereof for displacement along a guide rail. A brake pad is retained in a top end of the support arm and is actuated by a rotatable sleeve disposed at the bottom of the support arm whereby the brake pad is releasably engaged to arrest the arm at a desired location along the guide rail. A connecting bracket is rotatably secured to a bottom portion of the support arm to secure a device to be supported by the arm. A locking mechanism is actuable by the sleeve to unlock the connecting bracket to permit the device and the bracket to be rotatably displaced to a desired position and locked at such position. Particularly, but not exclusively, the support arm is for attaching a medical instrument in a suspended manner inside a patient's room of an ambulance.

12 Claims, 3 Drawing Sheets

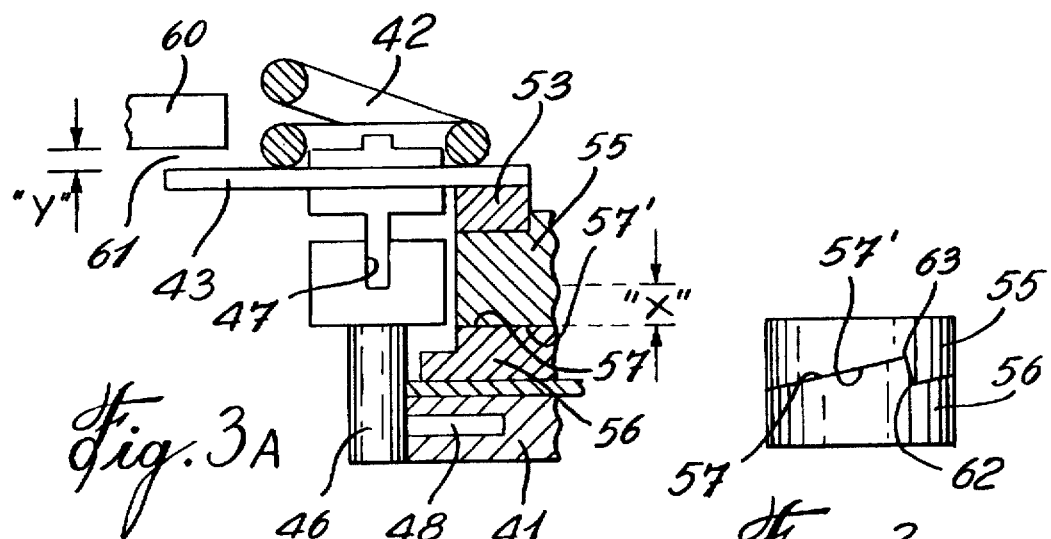
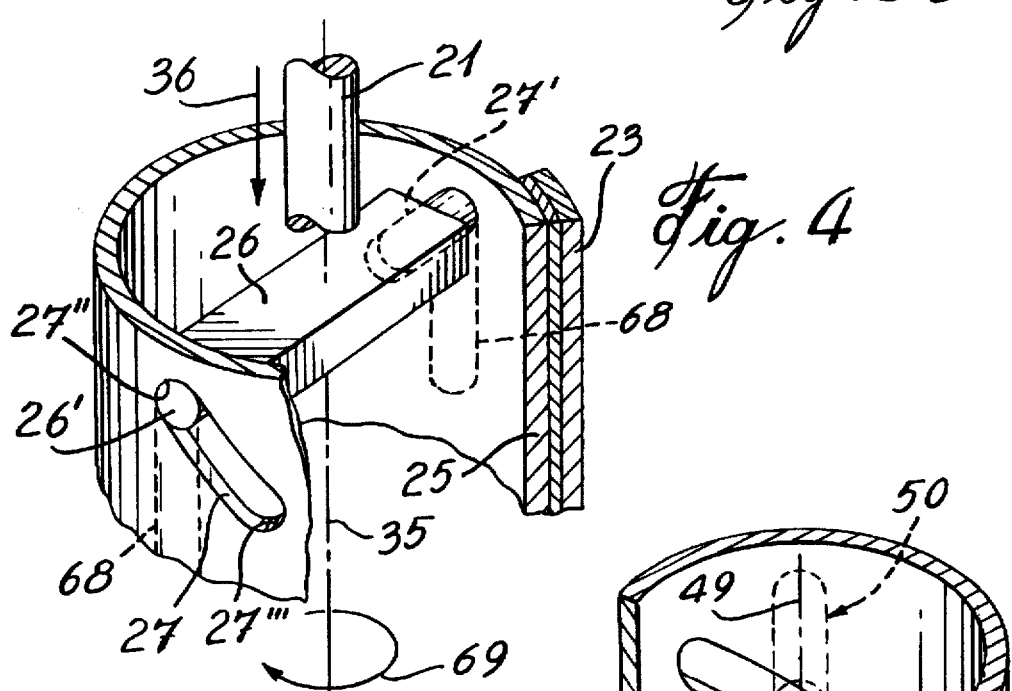
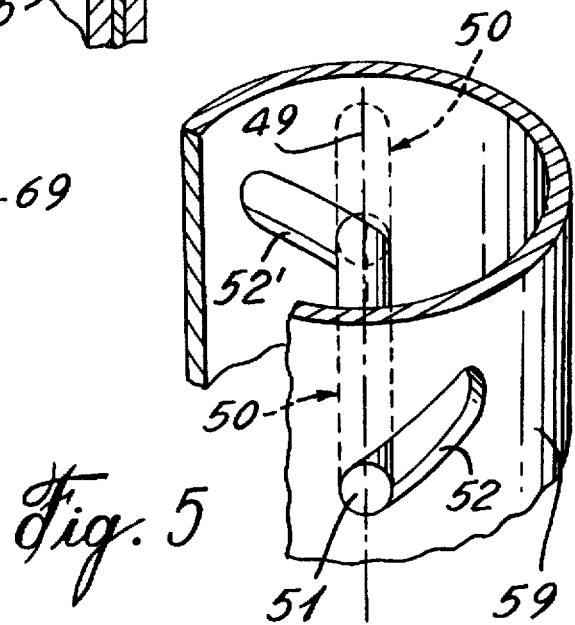

CEILING MOUNTED DISPLACEABLE SUPPORT ARM FOR SUSPENDING A DEVICE

TECHNICAL FIELD

The present invention relates to a support arm for attaching a device in a suspended manner along a rail and wherein the support arm may be displaced and locked in a desired position along the rail by actuating a release mechanism, and wherein the device supported by the arm may be rotatably displaced and locked in a desired position by further actuation of the release mechanism in a different direction, both these functions being made possible by the use of a single hand of a user person.

Particularly, but not exclusively, the support arm is for attaching a medical device in a suspended manner and displaceable along a guide rail which is secured to a ceiling of a patient's room of an ambulance, whereby the attendant may displace the device to a desired position for use while attending to a patient or while bracing himself with his free hand.

BACKGROUND ART

It is known to attach devices in a suspended manner by a support arm and particularly medical devices or similar objects. Some of these attachment devices may include stationary arms or hook means, such as that disclosed in U.S. Pat. Nos. 4,273,374 or 4,339,146, and for use inside ambulances. It is also known to displace a support arm along a guide rail fixed to a ceiling and having attachment means whereby the device can be rotated or else the rail rotated to angulate the device. Such further devices are for example described in U.S. Pat. Nos. 4,738,369 and 5,165,647. A disadvantage of many of these devices is that the support arm is often unstable and it is necessary for a user person to use both hands to operate two or more attachment mechanisms whereby to locate the device to a usable position. Many such attachment means are not practical when such devices are used inside ambulances which are in motion and wherein the attendant who is sitting in the ambulance has to care for the patient as well as to manipulate the device. Medical devices suspended from the ceiling of a patient's room in an ambulance are subjected to all sorts of forces and shocks generated by the rapid movement and braking of the vehicle or road conditions on which the vehicle is being displaced. This imparts abrupt shocks to the attendant as well as to the support mechanism to which the device is connected. This often results in injury to the attendant as well as to the patient who is being transported to hospital and most often under emergency conditions.

There is therefore a need to provide a support arm for attaching a device in a suspended manner and wherein the support arm, as well as the device, may be displaced to a desired position by an actuating mechanism which is operable by a single hand of the operator while maintaining failproof suspension of the device.

SUMMARY OF INVENTION

It is a feature of the present invention to provide a support arm for attaching a device in a suspended manner and which substantially overcomes the above-mentioned disadvantages of the prior art.

Another feature of the present invention is to provide a support arm for attaching a device in a suspended manner and wherein the support arm is provided with an actuating sleeve which when rotated in a first direction causes the support arm to be disengaged with a support rail and reengaged by brake means at a desired position along the rail when the sleeve is released.

Another feature of the present invention is to provide the support arm for attaching a device in a suspended manner and wherein when the sleeve is rotated in an opposite direction, it causes a support bracket on which a device is attached to the bottom end of the support arm to be rotated to a desired position and upon release of the actuating sleeve it is automatically locked at such desired position.

According to the above features, from a broad aspect, the present invention provides a support arm for attaching a device in a suspended manner. The support arm comprises displaceable attachment means secured to a top portion thereof to displace the arm along a guide means. Brake means is provided at the top end of the support arm. Actuating means is provided for releasable engagement of the brake means to arrest the arm at a desired location along the guide means. Connecting means is rotatably secured to a bottom portion of the support arm and adapted to secure a device to be supported by the support arm A locking mechanism is actuable by the actuating means to unlock the connecting means to permit the device to be rotatably displaced to a desired position and locked at such desired position.

According to a further broad aspect of the present invention there is further provided a brake drum mechanism associated with the locking mechanism to provide torque damping of the connection of the device to the bottom end of the support post.

BRIEF DESCRIPTION OF DRAWINGS

A preferred embodiment of the present invention will now be described with reference to the accompanying drawings in which:

FIG. 3A is a simplified view illustrating the operation of the torque damping means secured in the base of the support arm to dampen torque generated by the device supported at the bottom end of the support arm when subjected to external forces;

FIG. 3B is a simplified side view illustrating the interconnection of the discs of the torque damping means;

FIG. 4 is a simplified fragmented perspective view illustrating the operation of the brake actuating mechanism; and FIG. 5 is a simplified fragmented perspective view illustrating the operation of the locking mechanism.

DESCRIPTION OF PREFERRED EMBODIMENTS

Figure 1:
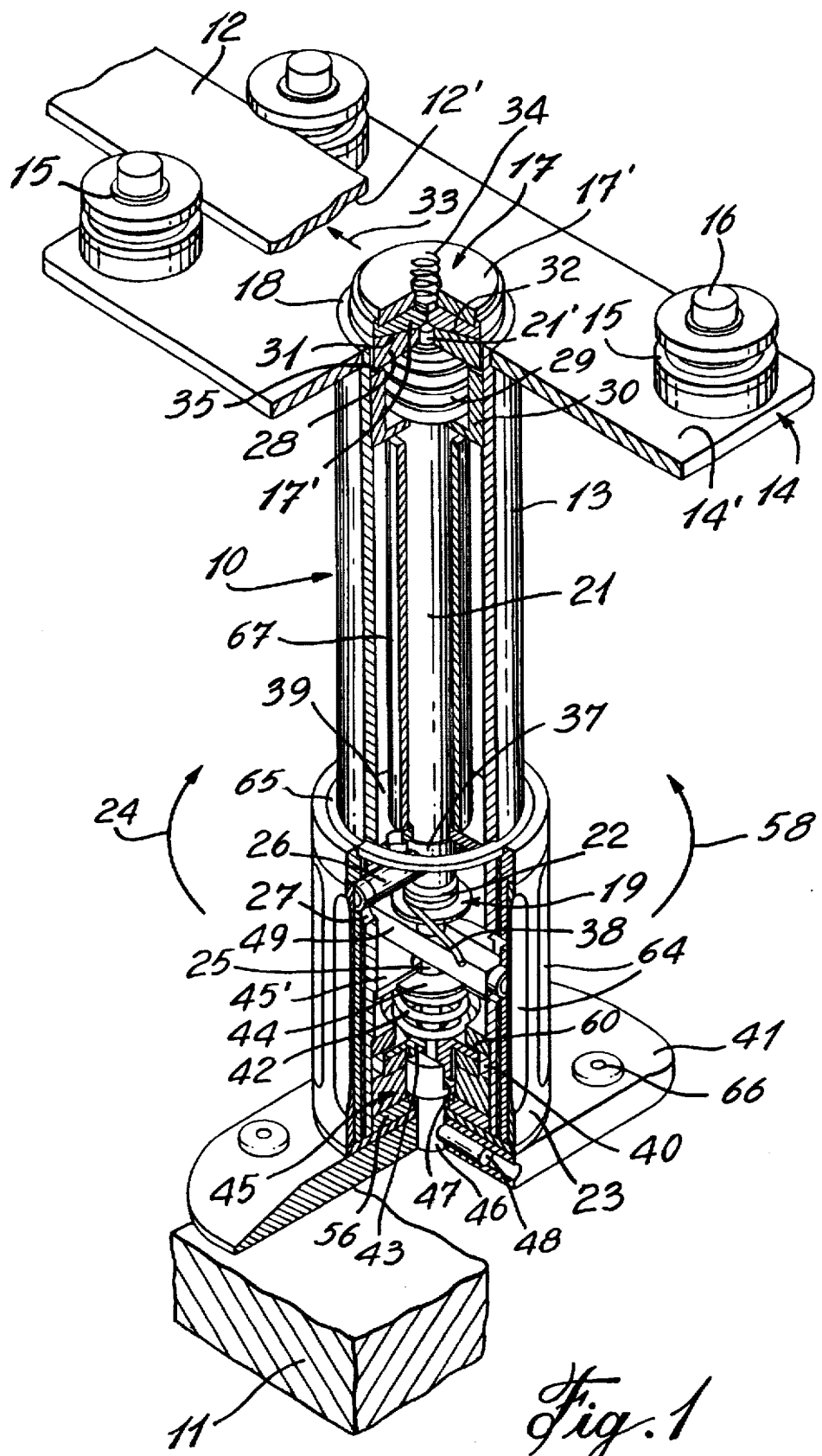
FIG. 1 is fragmented perspective view of the construction of the support arm of the present invention for supporting a device suspended from a top guide rail.

Referring now to the drawings, there is shown at 10 the support arm of the present invention for attaching a device 11 suspended from a guide rail 12. Particularly, but not exclusively, the guide rail is secured to the ceiling of a patient's room in an ambulance (not shown). The device 11, in this application, is a medical device, such as a pulse monitor or any other medical device that needs to be suspended and displaceable inside the patient's room before and often during the transportation of a patient and particularly in emergency situations.

As herein shown, the support arm is an elongated tubular member 13 of circular cross section and secured at a top end to a displaceable attachment means in the form of an attachment plate 14. The plate is provided, on a top wall 14' thereof, with guide rail engaging means in the form of two pairs of spaced apart guide sheaves 15 which are spaced apart and secured above the top wall 14 on a respective side of the support arm. The sheaves 15 are mounted about support post 16 and freely rotatable thereabout whereby the support arm 10 may be displaced along the rail 12 in an effortless manner.

Figure 2:
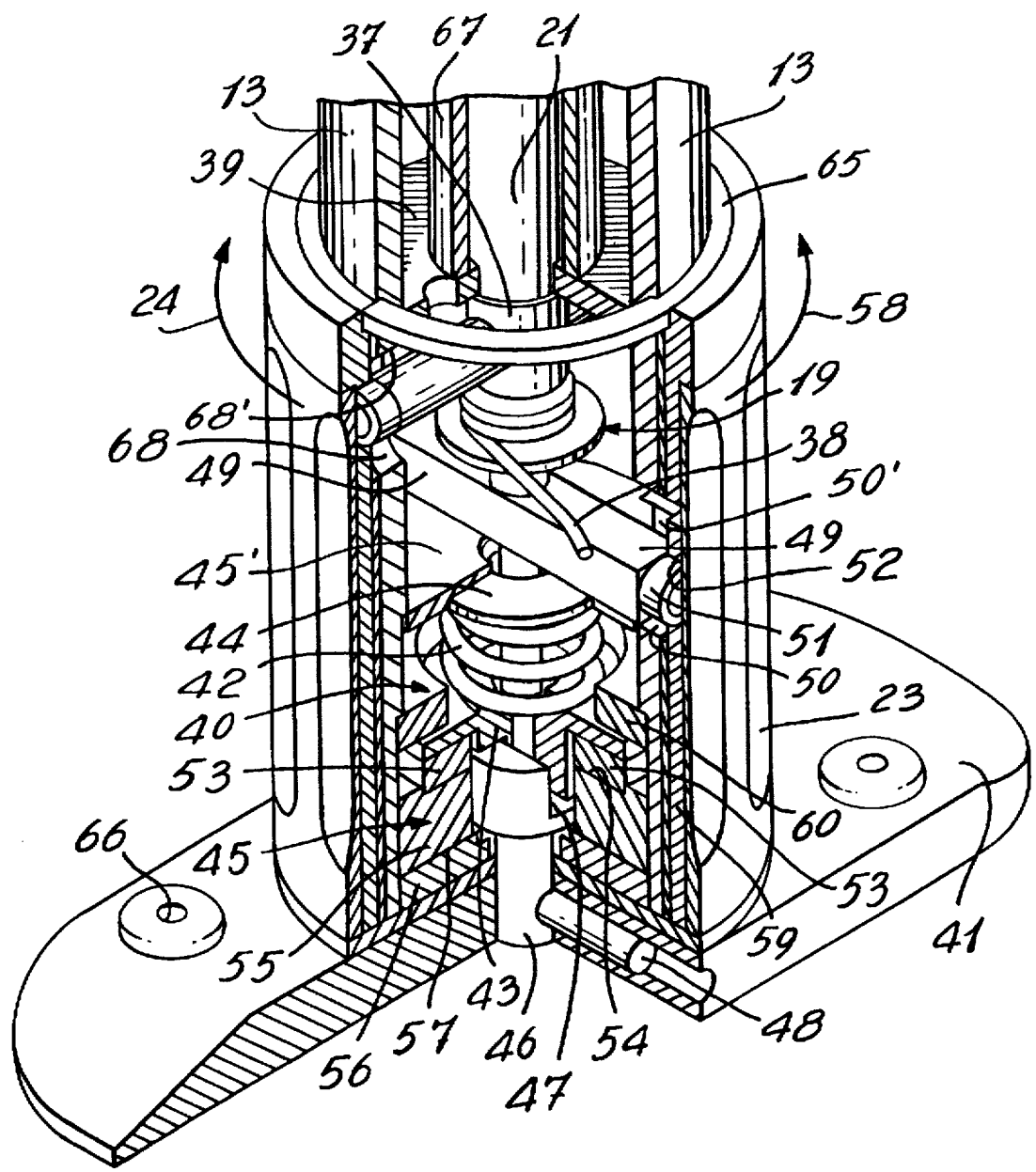
FIG. 2 is an enlarged fragmented view illustrating the construction of the rotatable actuating sleeve at the bottom end of the post and the internal actuating mechanisms to actuate the top brake pad and the bottom locking mechanism.

As herein shown, brake means in the form of a composite brake shoe 17 which protrudes from the top end 18 of the tubular member 13 for engagement with the underface 12' of the guide rail 12 which passes thereover whereby to arrest the support arm 10 against the lower face 12' of the guide rail. A brake actuating mechanism 19 is disposed in a lower section 20 of the support arm 10 and is connected to the brake shoe 17 by an internal actuating rod 21. The brake actuating mechanism 19 is provided with a torsion spring 22 which maintains a transverse follower pin 26 secured to the lower end of the actuating rod 21 and biased at its bearing ends 26' in a top end 27" of opposed angled guide slots 27 and 27', as shown in FIG. 4. The follower pin 26 extends at opposed bearing ends 26' through a top end 68' of opposed vertical guide slots 68 provided on the tubular member 13, as shown in FIG. 2. The torsion spring 22 therefore maintains the actuating rod in an upwardly biased position whereby to displace a brake shoe support plate 28 upwardly from its seated engagement with a support ring 30. A pin connection 21' connects the top end of the rod 21 to the support plate 28. A helical spring 29 sits on the support ring 30 to limit the downward travel of the brake shoe support plate when the follower pin 26 is displaced to a lower section of its arcuate opposed guide slots 27 and 27' by rotation of said actuating sleeve 23 in a clockwise direction as indicated by arrow 24.

As herein shown the brake shoe 17 sits on a circular disc 17" and is provided with a conical bottom face 31 supported on a concave conical cavity 32 of the brake shoe support plate 28 for close frictional fit with said conical bottom face. The conical cavity 32 and the conical bottom face 31 provide a forced damping connection to dampen lateral forces when the support arm is subjected to a lateral load. Accordingly, when the support arm is provided with a lateral load, as indicated by arrow 33, the brake shoe support plate will have a tendency to move along the direction of arrow 33 and because the brake shoe 17 is in frictional engagement with the lower face 12' of the guide rail 12, the brake shoe or brake disc 17 and the brake shoe support plate will slide in friction fit along both conical faces to try to separate. Because these faces are conical the resisting force will build up as the disc 17 is squeezed to resist the lateral load thereby providing a damping action.

It can be seen that a helical spring 34 also protrudes from above a top braking surface 17' of the brake shoe 17 and this spring is provided to exert a downward force on the disc or brake shoe 17 to prevent the top surface 17' of the brake shoe or disc from adhering to the lower face 12' of the guide rail 12. The gap 35 between the top end of the ring 30 and the support plate 28 limits the downward travel of the brake shoe relative to the support ring 30.

FIG. 4 is a schematic illustration showing how the transverse follower pin 26 is supported between the guide slots 27 and 27' provided in the inner sleeve 25 secured to the actuating sleeve 23. By rotating the sleeve 23 in a clockwise direction as indicated by arrow 69, it will cause the pin 26 to move downwardly along the central axis 35 and along the vertical guide slots 68, as indicated by dotted lines, to pull the internal actuating rod 21 downwardly in the direction of arrow 36 until the bearing ends 26' reach the bottom end 27" of the guide slot 27.

As shown in FIG. 1, the torsion spring 22 is secured at one end to a follower pin coupling 37 and at another end 38 to the lower section of the tubular member 13 (not shown) whereby to bias the transverse follower pin in the upper part of the angulated guide slots 27 and 27' and vertical guide slots 68. As also herein shown the internal actuating rod 21 is located within an inner cylinder chamber 67 which is disposed between the support ring 30, at its upper end, and a support ring 39 secured to the inner face of the elongated tubular member 13.

As shown in FIGS. 2, 3A and 3B, a locking mechanism 40 is housed in a bottom end of the elongated tubular member 13 and actuable by the actuating sleeve 23 to unlock a connecting bracket 41 from the bottom end of the support arm whereby to permit a 360° pivotal rotational displacement of the connecting bracket 41 and its device 11 whereby the device may be positioned at a desired angular position relative to the bottom of the support arm 10.

The locking mechanism 40 comprises a pressure spring 42 held in compression between a brake pad support disc 43 at a lower end, and a teflon disc 44 supported under a displaceable disc 45'. The brake pad support disc 43 is biased against a brake drum mechanism 45 secured to the connecting bracket 41 and which extends into the bottom section of the support arm. A connecting post 46 is engaged with the brake pad support disc 43 at an upper end through the slot 47 and secured at its bottom end by a connecting pin 48 to the connecting bracket 41.

As is also shown in FIGS. 2 and 5, the locking mechanism is further provided with a follower member 49 which extends at opposed bearing ends 51 through a lower end 50 of opposed vertical guide slots 50, provided in the elongated tubular member 13 for unobstruction thereof, and angulated guide slots 52 and 52' at opposed ends and located in the inner sleeve 59. When the actuating sleeve 23 is at its position of rest, the follower member 49 is engaged at its opposed bearing ends 51 at the lower end of their respective angulated guide slots 52 and 52' and vertical guide slots 50 shown in dotted lines, as shown in FIG. 5. In this manner the pressure spring 42 is compressed applying downward pressure on the brake pad support disc 43, causing the rubber disc 53 associated with the brake pad support disc 43 to be frictionally engaged with the top braking surface 54 of a top torque damping disc 55 of the brake drum mechanism 45. The brake drum mechanism 45, as shown in FIGS. 3A and 3B, also includes a bottom torque damping disc 56 which is connected to the base of the tubular member 13 and both the discs 55 and 56 are in facial engagement with one another along mating radially sloped formations 57 and 57', respectively, whereby to prevent rotation of the connecting bracket 41. The operation of the torque damping connection of the brake drum mechanism will be described later.

In order to remove pressure from the brake drum mechanism 45 to thereby release the frictional engagement between the rubber disc 53 and the top braking surface 54 of the top torque damping disc 55, it is necessary to rotate the actuating sleeve 23 in a counterclockwise direction as indicated by arrow 58 to impart a rotation to the inner sleeve 59 secured to the actuating sleeve 23 to remove the downward pressure on the follower member 49 by causing the opposed cylinder ends 51 of the follower member to relocate themselves in the upper ends of their respective angulated guide slots 52 and 52' and vertical guide slots 50, as shown in FIG. 5. This upward movement of the follower member 49 removes the biasing pressure on the pressure spring 42 making it possible for the brake pad support disc 43 to rotate about the top face of the top torque damping disc 55 with the rubber disc 53 now in non-pressure or in sliding fit therewith. Accordingly, the connecting post 46, which is secured to the connecting bracket 41, is free to rotate within the braking mechanism 40 with the brake pad support disc 43 also being freely rotatable therein.

As shown in FIGS. 3A and 3B, the torque damping discs 55 and 56 are in facial engagement along mating radially sloped saw tooth-like formation 57 and 57' whereby when the connecting bracket 41 and/or the device 11 secured thereto is subjected to a torque force caused by load shocks imparted to the top torque damping disc 55, a rotation will be imparted to the lower disc causing it to rotate with respect to the lower torque damping disc 56 and through the slope formations 57 and 57' apply an upward increasing force on the upper disc 55. However, as seen in FIG. 3A, the upper disc 55 is limited from upward displacement, by an abutment ring 60 immovably secured to the tubular member 13, a predetermined distance above the brake pad support disc 43 so as to limit the upward travel of the top torque damping disc as it rotates with respect to the bottom damping disc. This space "y" between the abutment ring 60 and the top wall of the brake pad support disc 43 is illustrated by reference numeral 61 in FIG. 3A. The gap "y" defined by the space 61 is also smaller than the gap "x" defined between the bottom end 62 of the radially sloped formations 57 or 57' and the peak opposite end 63 thereof (see FIG. 3B) whereby the torque damping discs 55 and 56 cannot separate.

The actuating sleeve 23 may be provided with finger engaging formations 64 thereabout or alternatively may be provided with a rubber-like gripping surface to permit non-slip engagement thereof by the user's hand. As herein shown, a lock ring 65 also interconnects the actuating sleeve 23 in rotational displacement with respect to the elongated tubular member 13. The connecting bracket 41 may also have a different shape and as herein shown it is a plate provided with through holes 66 to receive fastening bolts to secure a device or instrument 11 thereto, see FIG. 1.

It is within the ambit of the present invention to provide any other obvious modifications of the preferred embodiment described herein, provide such modifications fall within the scope of the appended claims.

We claim:

1. A displaceable support arm for attaching a device in a suspended manner, said support arm comprising displaceable attachment means secured to a top portion of said support arm to displace said arm along a guide means, brake means in a top end of said support arm, actuation means for releasable engagement of said brake means to arrest said arm at a desired location along said guide means, connecting means rotatably secured to a bottom portion of said support arm and adapted to secure a device to be supported by said support arm, a locking mechanism actuable by said actuation means to unlock said connecting means to permit said device to be rotatably displaced to a desired position and locked at such desired position.

2. A displaceable support arm as claimed in claim 1 wherein said actuation means comprises a sleeve rotatably secured about said arm and a brake actuating mechanism disposed inside said arm, said brake actuating mechanism being released by rotating said sleeve in a first direction whereby to free said support arm for displacement along said guide means, said locking mechanism being unlocked by rotating said sleeve in a second opposite direction to rotatably displace said connecting means.

3. A displaceable support arm as claimed in claim 2 wherein said brake means comprises a brake shoe protruding from a top end of said arm for arresting engagement with said guide means, said brake actuating mechanism being disposed in a lower section of said support arm and connected to said brake shoe by an internal actuating rod, said brake actuating mechanism having pressure biasing means to maintain an upward force on said brake shoe through said actuating rod for arresting engagement of said brake shoe with said guide means, said pressure biasing means being released by rotational displacement of said sleeve in said first direction to thereby remove pressure from said brake shoe to permit displacement of said displaceable attachment means along said guide means.

4. A displaceable support arm as claimed in claim 3 wherein said brake shoe is a composite brake disc having a conical bottom face supported on a brake shoe support plate having a concave conical cavity for close friction fit with said conical bottom face, said conical cavity and conical bottom face providing a force damping connection to dampen lateral forces when said support arm is subjected to a lateral load.

5. A displaceable support arm as claimed in claim 3 wherein said brake shoe has a helical spring protruding from above a top braking surface thereof to exert a downward force on said braking surface to prevent said braking surface from adhering to said guide means.

6. A displaceable support arm as claimed in claim 2 wherein said brake actuating mechanism comprises a torsion spring secured to a follower pin coupling mounted about a base section of said internal actuating rod to apply a torsional force thereto, a follower member secured to said coupling, said follower member being retained between opposed angulated guide slots formed in a lower tubular section of said support arm and biased to a top end of said guide slots by said torsion spring to place said rod biased upwardly to a brake engaging position, said sleeve when rotated in said first direction causing said follower member to be displaced to a bottom opposed end of said guide slots to lower said internal actuating rod to remove pressure from said brake disc to disengage said brake disc from said guide means.

7. A displaceable support arm as claimed in claim 2 wherein said locking mechanism is disposed in a bottom section of said support arm and comprises a pressure spring held in compression against a brake pad support disc, said brake pad support disc being biased against a brake drum mechanism secured to said connecting means and extending into said bottom section of said support arm, a connecting post securing said brake pad support disc to said connecting means, said sleeve when rotated in said second opposite direction removing pressure from said pressure spring against said pad support disc to permit said connecting means and a device secured thereto to be rotated about a bottom end of said support arm.

8. A displaceable support arm as claimed in claim 7 wherein said spring is a helical spring held in compression between a top disc and said brake pad support disc by a follower member secured in said bottom section and retained between opposed angulated guide slots and biased to a bottom end of said guide slots to maintain a compression force on said brake pad support disc, said sleeve when rotated in said second opposite direction removing said compression force sufficiently to disengage said brake pad support disc from said brake drum mechanism to permit said connecting post which is secured to said connecting means and said brake pad support disc to rotate 360° with respect to said bottom end of said support arm.

9. A displaceable support arm as claimed in claim 8 wherein said brake drum mechanism comprises a pair of torque damping discs coupled together in facial engagement along mating radially sloped formations whereby when said connecting means is subjected to a torque force caused by load shocks a lower one of said discs secured to said connecting means will rotate with respect to an upper one of disc and through said sloped formation apply an upward increasing force on said upper one of said disc, and an abutment ring spaced a predetermined distance above said brake pad support disc to limit the upward displacement of said upper one of said disc while maintaining said sloped formations of both said disc partly in facial frictional engagement.

10. A displaceable support arm as claimed in claim 9 wherein said connecting means is an attachment bracket to secure a medical device to said bottom end of said support post, said support post being displaceably connected at its upper end to a guide rail adapted to a ceiling of a patient's room of an ambulance.

11. A displaceable support arm as claimed in claim 1 wherein said displaceable attachment means is an attachment plate having rail engaging means for guided displacement along a guide rail, said guide rail constituting said guide means.

12. A displaceable support arm as claimed in claim 1 wherein said rail engaging means comprises a pair of spaced apart guide sheaves secured to a top wall of said attachment plate and on respective sides of said support arm, and a flat plate guide rail retained captive between said pairs of guide sheaves, said brake means engaging a lower surface of said flat plate guide rail when actuated to an engaging position.

* * * * *